United States Patent
Park et al.

[19]

[11] Patent Number: 5,978,343
[45] Date of Patent: Nov. 2, 1999

[54] MULTIPLE TRACK SCANNING METHOD FOR OPTICAL PICKUP

[75] Inventors: Soo-han Park, Suwon; Won-seok Jung, Seongnam; Jong-hwa Won, Yongin, all of Rep. of Korea

[73] Assignee: Samsung Electronics Co., Ltd., Kyungki-Do, Rep. of Korea

[21] Appl. No.: 08/960,061

[22] Filed: Oct. 29, 1997

[30] Foreign Application Priority Data

Oct. 29, 1996 [KR] Rep. of Korea ................... 96-49777

[51] Int. Cl.$^6$ ........................................ G11B 7/00
[52] U.S. Cl. .............................. 369/95; 369/44.37
[58] Field of Search ...................... 369/95, 94, 93, 369/47, 48, 49, 50, 54, 58, 59, 44.11, 44.12, 44.28, 44.34, 44.37, 44.38, 44.41, 124, 32, 112

[56] References Cited

U.S. PATENT DOCUMENTS

| | | | |
|---|---|---|---|
| 5,140,577 | 8/1992 | Ohsato | 369/44.37 |
| 5,457,670 | 10/1995 | Maeda et al. | 369/44.28 |
| 5,511,051 | 4/1996 | Rokutan et al. | 369/44.28 |
| 5,583,836 | 12/1996 | Rokutan et al. | 369/44.28 |

FOREIGN PATENT DOCUMENTS

| | | |
|---|---|---|
| 0 019 379 | 11/1980 | European Pat. Off. . |
| 0 400 927 | 12/1990 | European Pat. Off. . |
| 0 487 296 | 5/1992 | European Pat. Off. . |
| 9-22533 | 1/1997 | Japan . |

OTHER PUBLICATIONS

Patent Abstracts of Japan vol. 096, No. 001, Jan. 31, 1996 & JP 07 244859 A (Mitsubishi Electric Corp) Sep. 19, 1995 *Abstract.

*Primary Examiner*—Muhammad Edun
*Attorney, Agent, or Firm*—Sughrue, Mion, Zinn, Macpeak & Seas, PLLC

[57] ABSTRACT

A method of scanning multiple tracks uses an optical pickup to simultaneously emit a plurality of beams on a plurality of tracks on a disk, and satisfies the equations: $N_j=(N_b-1)N_g-1$ and $N_r=N_bN_g-1$. Here, $N_j$ represents the number of jumped tracks, $N_b$ represents the number of light beams, $N_g$ represents the interval between the light beams, and $N_r$ represents the number of reproduced tracks during a reproduction period.

2 Claims, 8 Drawing Sheets

MULTIPLE TRACK SCANNING METHOD FOR OPTICAL PICKUP

BACKGROUND OF THE INVENTION

1. Field of Invention

The present invention relates to a method of scanning multiple tracks using an optical pickup using multiple optical spots, and more particularly, to a method of scanning multiple tracks using an optical pickup enabling high speed scanning without an increase in the rotational speed of a spindle motor by optimizing the interval between light spots and the number of tracks jumped.

2. Description of Related Art

Referring to FIG. 1 showing the configuration of a typical optical pickup device, a beam emitted from a light source 10 passes through a beam splitter 20, is converted into a parallel beam by a collimating lens 25 and is converged on a recording surface of a disk 1 by an object lens 30. Also, the beam reflected from the disk 1 proceeds toward a photodetector 50 by the beam splitter 20 and the photodetector 50 detects an RF (radio-frequency) information signal and an error signal from the reflected beam. Reference numeral 40 represents an astigmatism lens.

In the above optical pickup device, recording and reproduction of information are performed as a single beam emitted from the light source 10 follows a track spirally formed on a recording surface of the disk 1. When such an optical pickup device is adopted in a high speed multimedia subsystem, e.g., having a speed beyond 8×, a spindle motor which enables rapid control of the RPM (revolutions per minute) is required to increase the high data transfer rate. Also, in the case when the high speed data transfer is achieved by increasing the RPM of the spindle motor, correction of the RF response characteristic in an actuator (not shown) of the optical pickup and conversion of the frequency characteristic of a servo circuit and an RF amplifying circuit are required.

Also, when a disk is driven at a CLV (constant linear velocity), the rotational speed of the disk must change rapidly while an optical pickup is moved radially across the disk resulting in increased torque and heat generation. Such heat affects each element of the optical pickup causing a deterioration in the signal.

In addressing the above problems, an optical pickup device is developed using a light source which emits multiple beams simultaneously to a plurality of tracks to thereby scan multiple tracks of a disk at once. Namely, N light spots emitted simultaneously from the light source in one disk rotation read information recorded on N tracks.

FIG. 2 shows a disk 1 and an enlarged portion thereof in which three beams concurrently emitted from a light source (not shown) form respective spots on the disk 1. Referring to the drawing, tracks 2 are formed spirally from the center of the disk 1 toward the outer circumference thereof. A groove 3 is formed between the tracks 2 and pits 2' corresponding to a recorded information signal.

In an optical pickup capable of scanning multiple tracks, high speeds cannot be readily achieved when the optical pickup is driven without consideration to the number of beams, the interval between beams, and a track jump to prevent double reproduction of a track. For instance, when first, second and third light spots 60a, 60b, and 60c emitted from the light source are first formed on first, second and third tracks 2a, 2b and 2c of the disk 1, respectively, as the disk rotates one time, the first light spot 60a, the second light spot 60b and the third light spot 60c move to the second track 2b, the third track 2c and a fourth track (not shown). Thus, the light spots are focused on the second and third tracks 2b and 2c repeatedly so that the efficiency in data reproduction is lowered.

FIG. 3 shows a graph indicating the relative speed ratio according to the number of multiple beams in performing multiple tracks scanning of a disk. Here, lines 101 through 106 represent the relative speed ratios according to the number of multiple beams for each of spindle motors having 2×, 4×, 6×, 8×, 10× and 12× speeds, respectively. As indicated in the drawing, when 3 beams are employed, the speed ratios of the 2× through 12× spindle motors improve by approximately twofold. Also, when there are 8 beams, the speed ratio of the 2× spindle motor (see line 101) becomes about 6 times faster and the speed ratio becomes about 2.5 times faster with respect to the 12× spindle motor (see line 106).

As mentioned above, in the conventional multiple track scanning method, since information on a portion of the tracks is repeatedly reproduced every rotation of the disk, the speed ratio does not increase linearly with an increase in the number of the multiple beams.

SUMMARY OF THE INVENTION

To overcome the above problems, it is an objective of the present invention to provide a method of scanning multiple tracks using an optical pickup which enables a higher speed ratio by employing multiple beams and jumping tracks to minimize the time required for reproducing one track of a disk.

Accordingly, to achieve the above objective, there is provided a method of scanning multiple tracks using an optical pickup to simultaneously emit a plurality of beams on a plurality of tracks on a disk, wherein the multiple tracks scanning method satisfies the following equations:

$$N_j = (N_b - 1)N_g - 1 \text{ and}$$

$$N_r = N_b N_g - 1,$$

wherein $N_j$ represents the number of jumped tracks, $N_b$ represents the number of light beams, $N_g$ represents the interval between the light beams, and $N_r$ represents the number of reproduced tracks during a reproduction period.

It is preferred in the present invention that the method satisfies the following equation:

$$T_1 T_j (N_b N_g - N_g - 1)/N_r + N_d T_c / N_r,$$

wherein $T_1$ represents the time required for reproducing one track, $T_j$ represents the time required for a track jump of the optical pickup, $T_c$ represents the time required for one rotation of the disk, and $N_d$ represents the number of disk rotations during the reproduction period.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
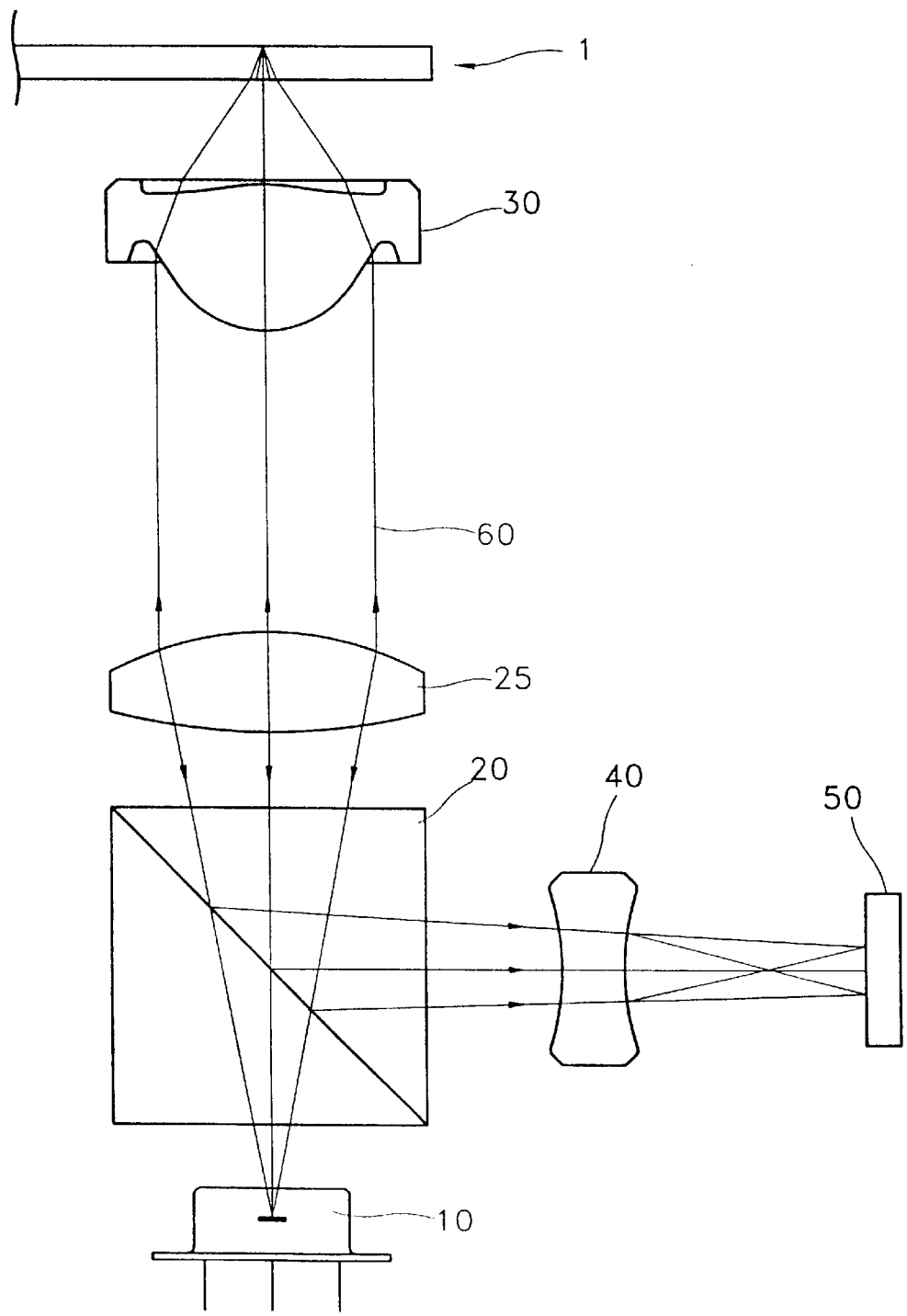
FIG 1 is a diagram showing an optical arrangement for a typical optical pickup device.
Figures 2A, 2B:
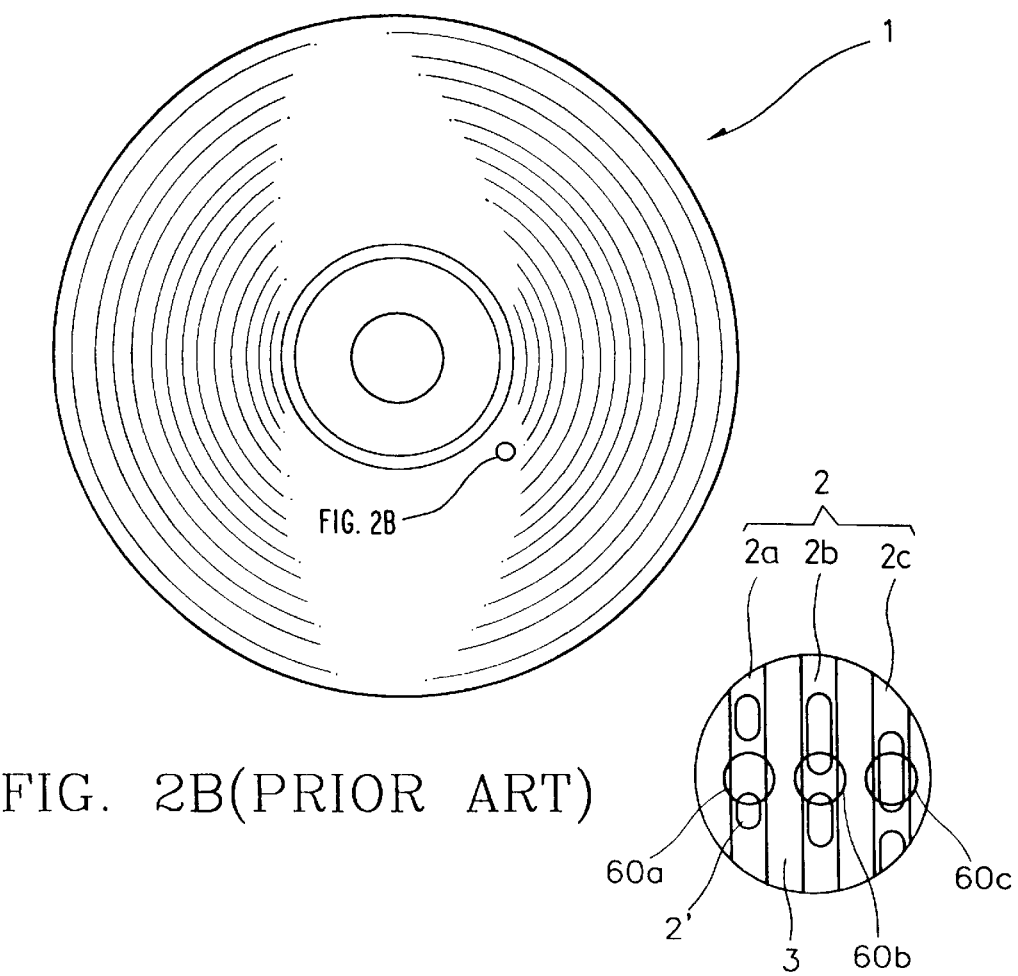
FIG. 2 is a plan view illustrating a disk and an enlarged portion of the disk on which three light spots are formed.
Figure 3:
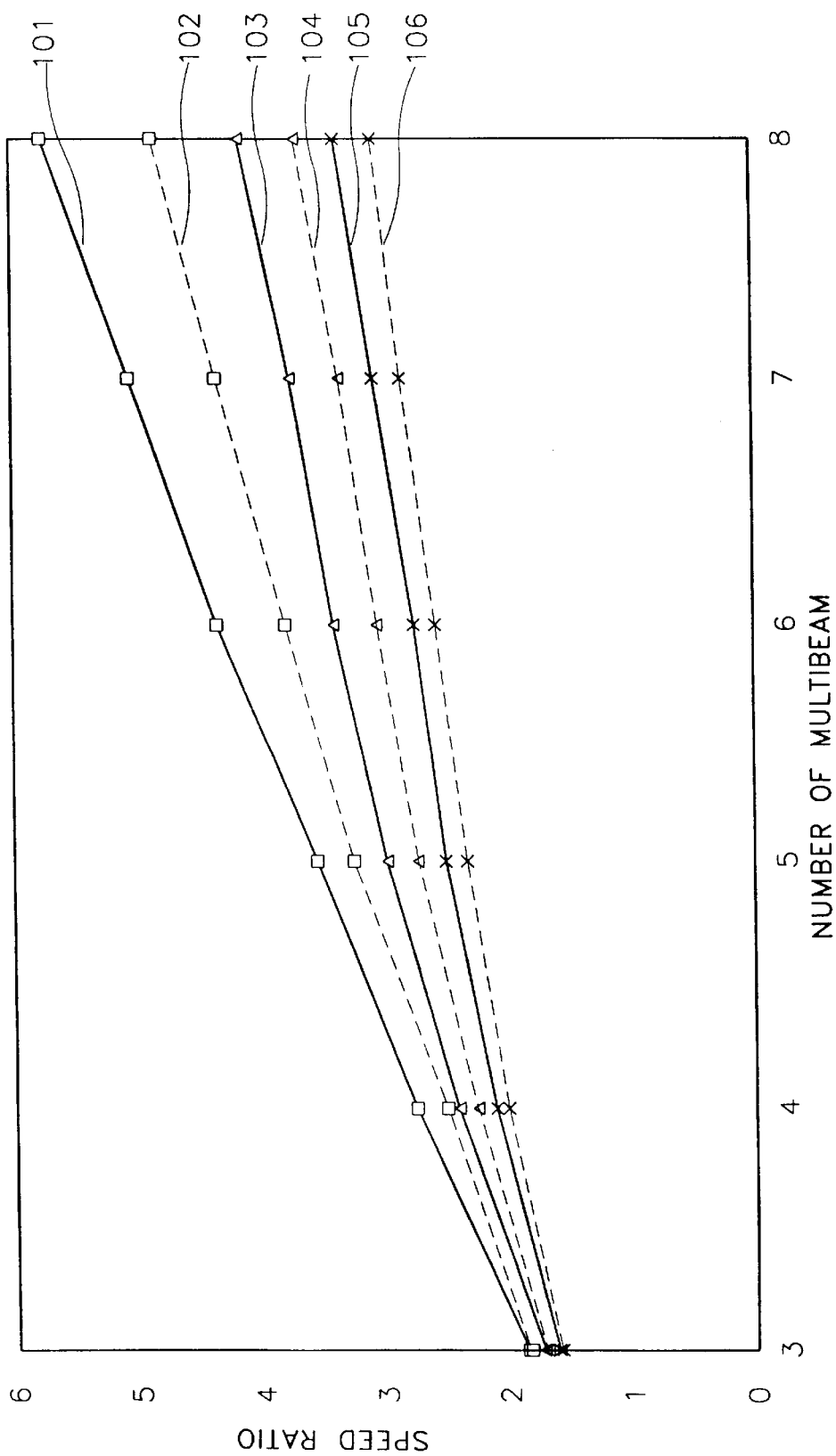
FIG. 3 is a graph for showing the speed ratio according to the number of multiple beams in the conventional method of scanning multiple tracks using an optical pickup.
Figure 4:
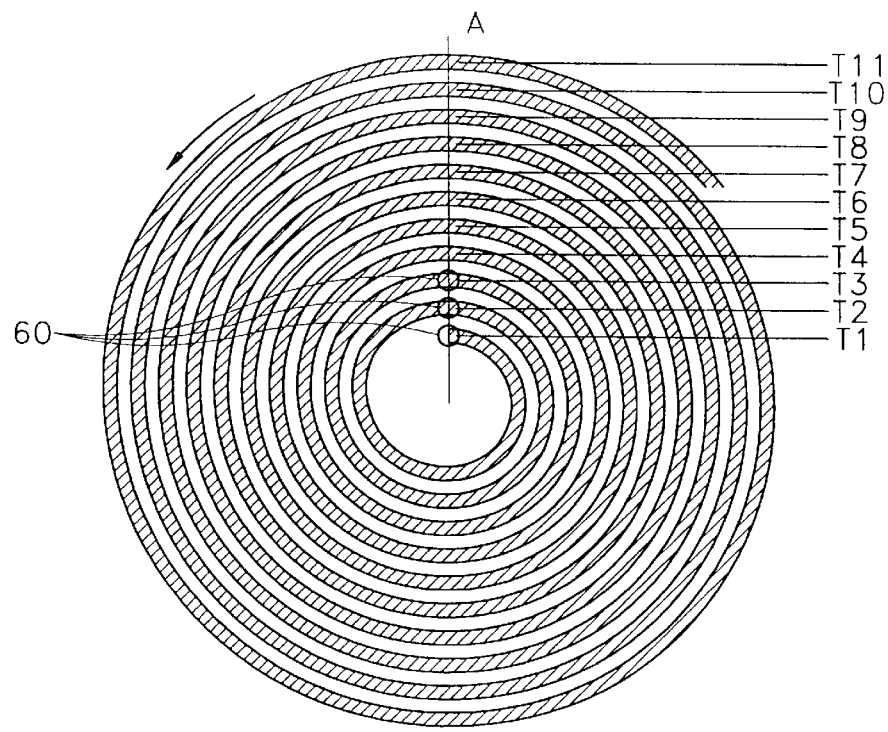
FIGS. 4 through 6 are views schematically illustrating a disk for explaining a method of scanning multiple tracks using an optical pickup according to a preferred embodiment of the present invention.
Figure 5:
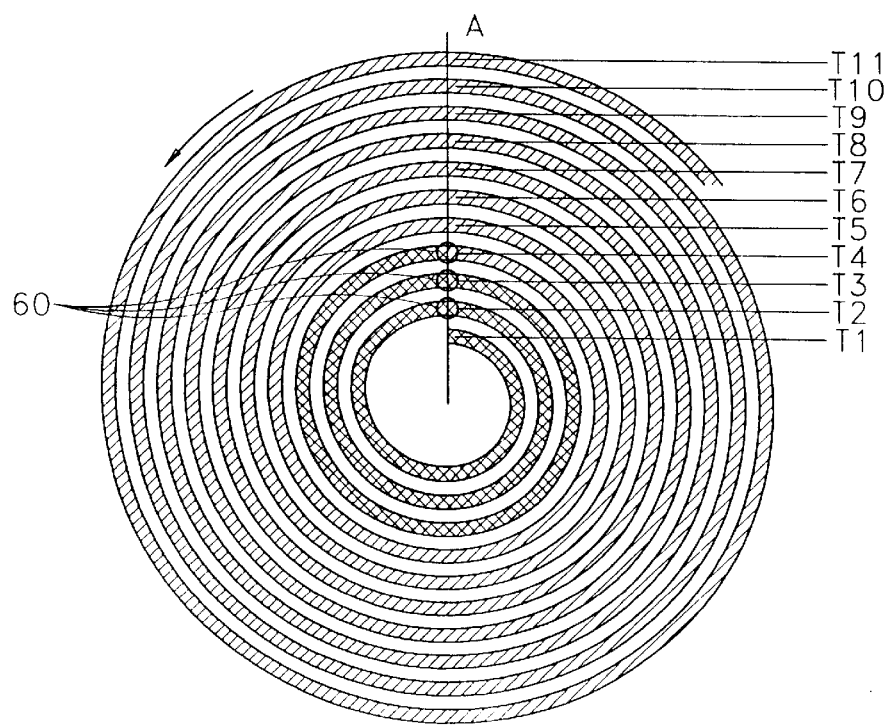
Figure 6:
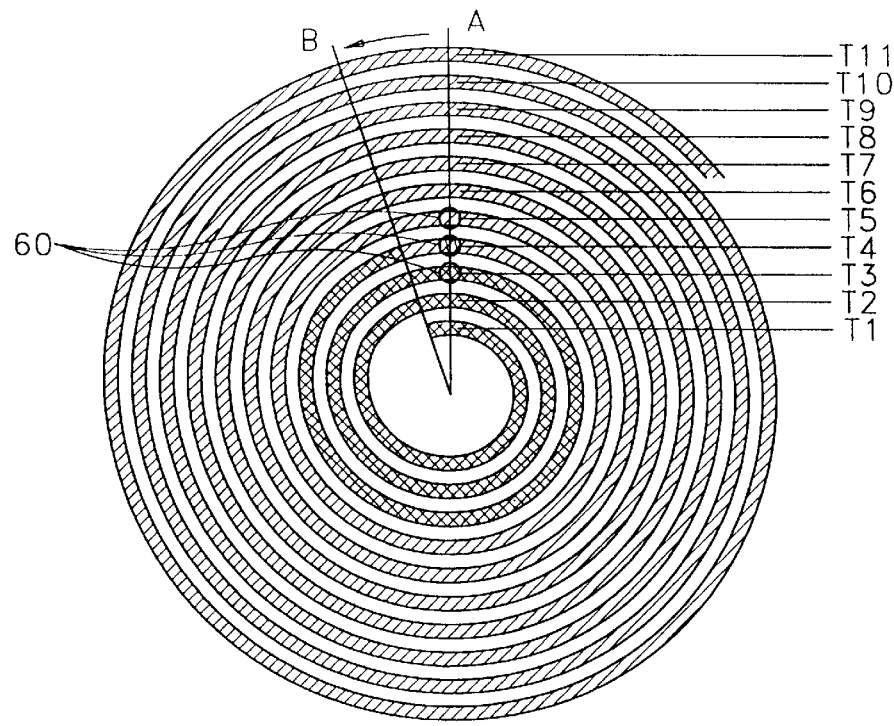

In FIGS. 4 through 6, a disk is illustrated for the explanation of a multiple track scanning method using an optical pickup according to a preferred embodiment of the present invention in which the hatched section represents tracks T1–T11 where information is recorded.

As shown in FIG. 4, three light spots 60 initially emitted from a light source (not shown) are formed in series on the first, second and third tracks T1, T2 and T3 of the disk along line A. That is, the distance between the light spots is defined as "1" in the present embodiment which means that the distance between the light spots is the same as the distance between the tracks. As the disk rotates in a direction of an arrow, i.e., counterclockwise, making a rotation, the optical pickup scans the first, second and third tracks T1, T2 and T3 to reproduce the recorded information. Then, as shown in FIG. 5, the light spots 60 are respectively located on the second, third and fourth tracks T2, T3 and T4 along line A. In the drawing, the double hatched section represents the portion of the track scanned by the optical pickup. Next, as shown in FIG. 6, the optical pickup jumps a track so that the three spots 60 are moved to the third, fourth and fifth tracks T3, T4 and T5. Here, the disk rotates further from line A to line B while the track jump of the optical pickup 60 is being made. Thus, a section between the line A and line B on the fourth track T4 remains unscanned. Then, as the disk rotates, tracks are scanned. That is, the third track T3 and a portion of the fourth track T4 are double scanned and the unscanned section of the fourth track T4 is then scanned. The above processes are repeated.

FIGS. 7 through 11 show a method of scanning multiple tracks of an optical pickup according to another embodiment of the present invention. Here, the same reference numerals indicate the same members.

Figure 7:
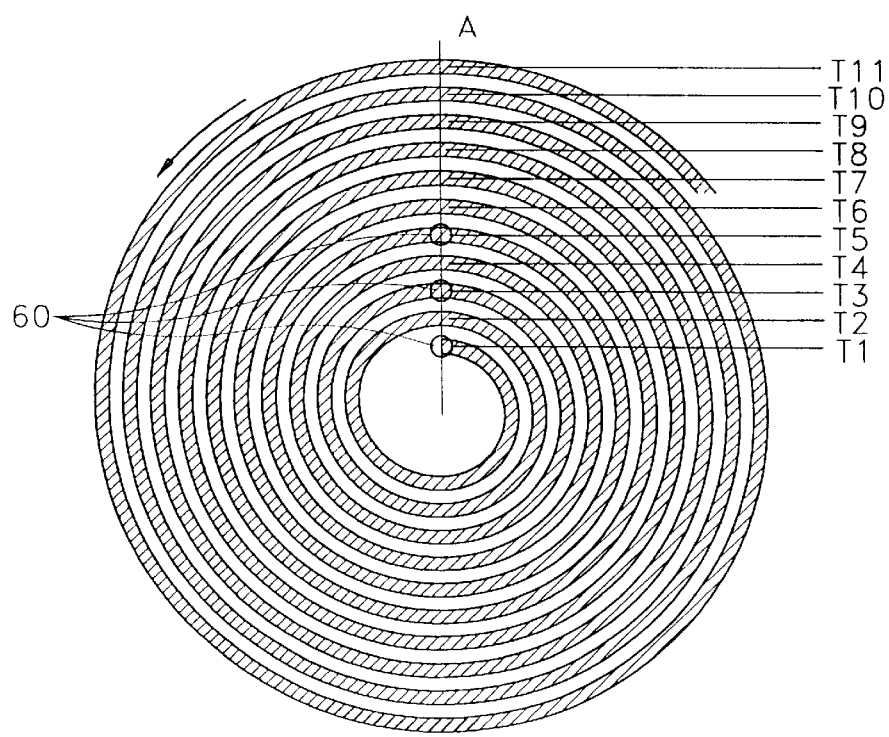
FIGS. 7 through 11 are views schematically illustrating a disk for explaining a method of scanning multiple tracks using an optical pickup according to another preferred embodiment of the present invention.
Figure 8:
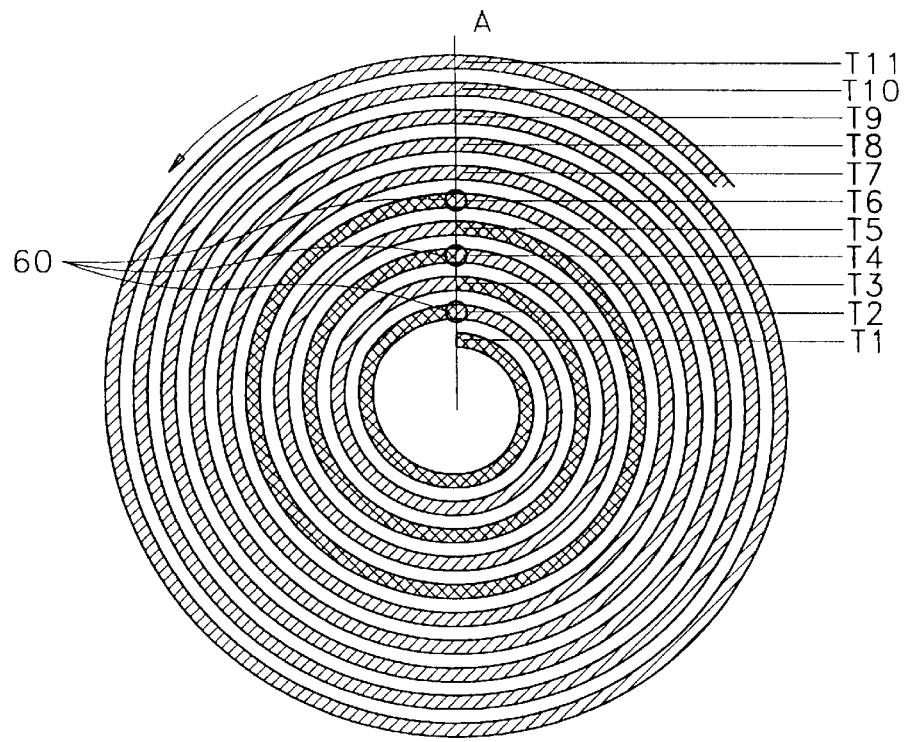
Figure 9:
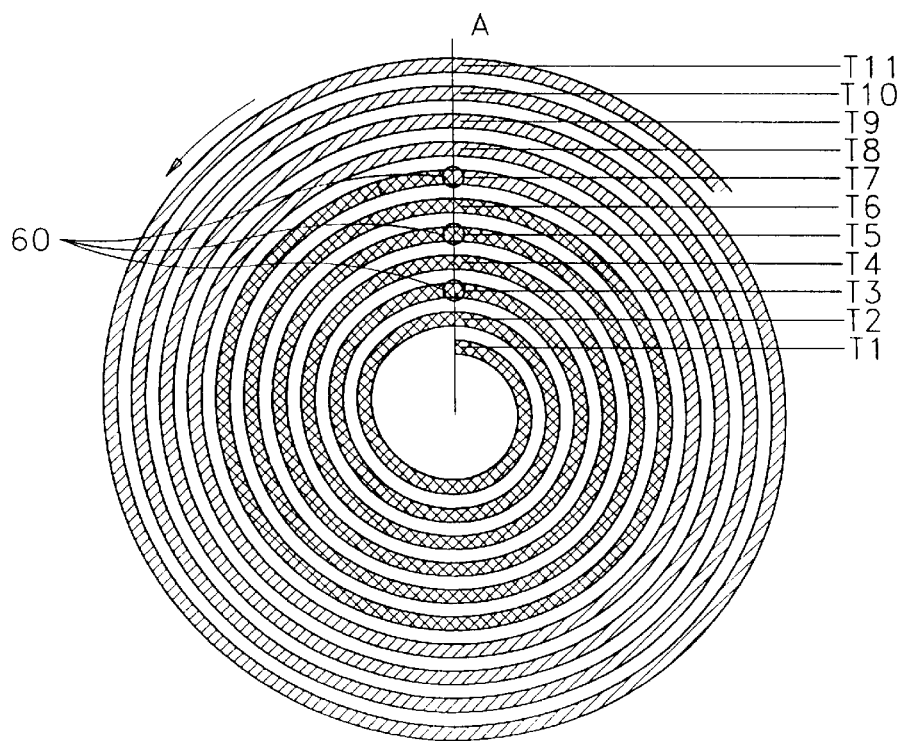
Figure 10:
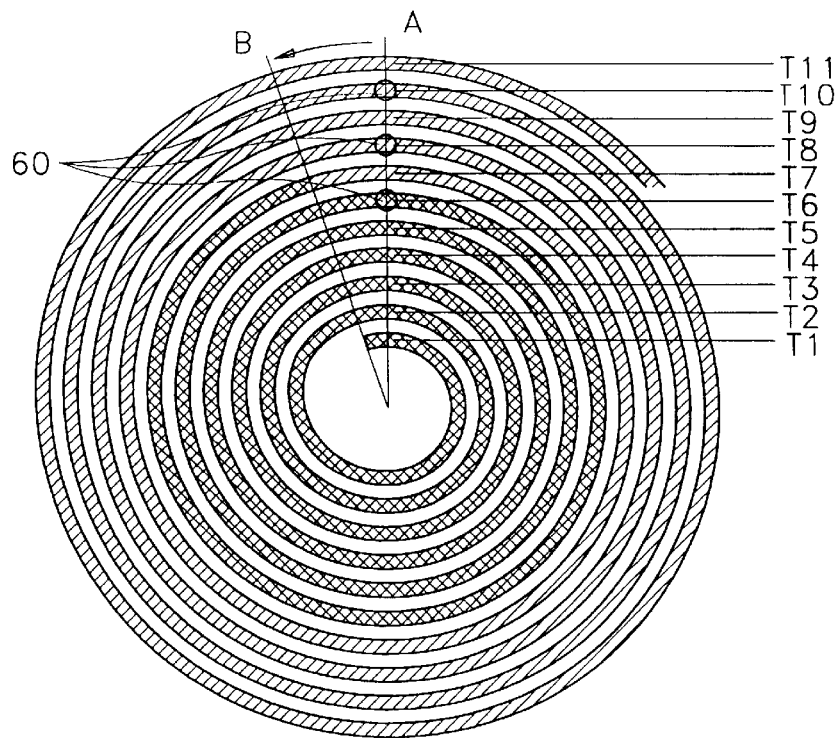
Figure 11:
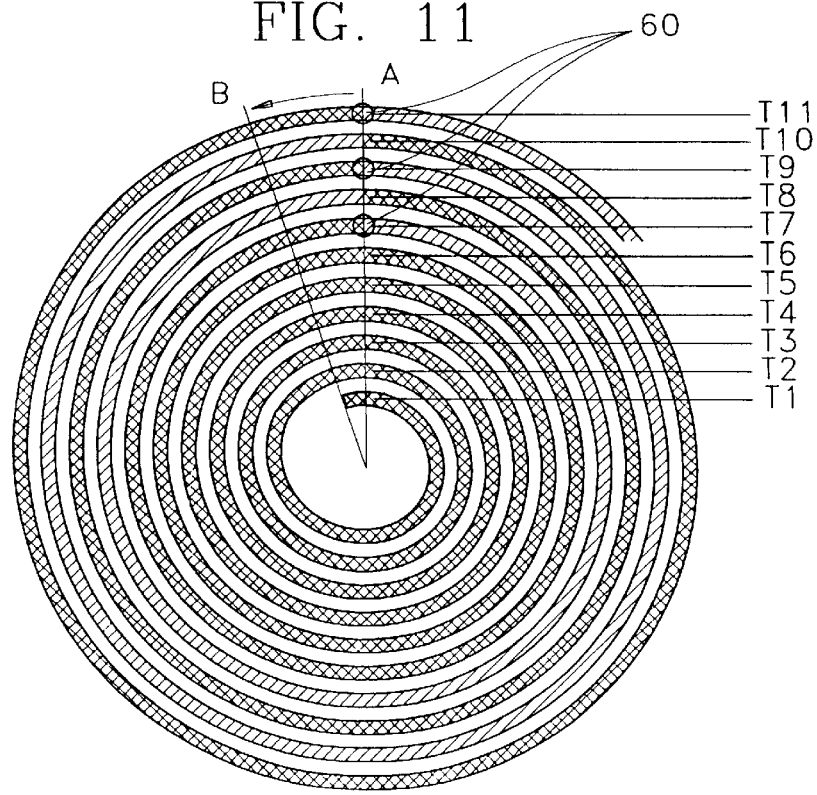

As shown in FIG. 7, three light spots 60 initially emitted from a light source (not shown) are formed in series on the first, third and fifth tracks T1, T3 and T5 of a disk along line A. That is, the distance between the light spots is defined as "2" in the present embodiment, which means that the distance between the light spots is two times the distance between the tracks. As the disk rotates in the direction indicated by the arrow, i.e., counterclockwise, making a rotation, the optical pickup scans the first, third and fifth tracks T1, T3 and T5 to reproduce the recorded information. Then, as shown in FIG. 8, the light spots 60 are located on the second, fourth and sixth tracks T2, T4 and T6, respectively. At this time, since there remains an unscanned section on each track, the disk is further rotated to relocate the light spot 60 on the third, fifth and seventh tracks T3, T5 and T7, as shown in FIG. 9. Accordingly, the first through sixth tracks T1–T6 and a portion of the seventh track T7 are scanned. Next, the optical pickup jumps three tracks so that the three spots 60 are moved to the sixth, eighth and tenth tracks T6, T8 and T10. Here, the disk rotates further from line A to line B while the track jump of the optical pickup 60 is being made. Thus, a section between line A and line B on the seventh track T7 remains unscanned. Then, as the disk rotates, tracks are scanned. As shown in FIG. 11, the unscanned section of the seventh track T7 is then scanned. The above scanning processes are repeated.

In the above described embodiments, the total track reproducing time $T_t$ with respect to one reproduction period of the optical pickup is represented as follows.

$$T_t = T_j\{(N_b-1)N_g-1\} + N_d T_c \quad \ldots (1)$$

Here, the number of beams is $N_b$; the interval between light beams is $N_g$; the time required for a track jump is $T_j$; the time required for a rotation of disk is $T_c$; and the number of disk rotations during the reproduction period is $N_d$. The "reproduction period" defined in the specification and claims means the time required for reproduction of all tracks on which light beams are formed and all tracks in between. That is, in the embodiment shown in FIG. 4, the reproduction time corresponds to the time for one rotation of the disk; and in the embodiment shown in FIG. 7, the reproduction time corresponds to the time for two rotations of the disk.

Also, the time $T_1$ required in reproducing one track is expressed as follows.

$$T_1 = T_t/N_r = T_j\{(N_b-1)N_g-1\}/N_r + N_d T_c/N_r = T_j(N_b N_g - N_g - 1)/N_r + N_d T_c/N_r \quad \ldots (2)$$

Here, $N_r$ is the number of reproduced tracks during the reproduction period, and the other parameters are the same as those defined in equation (1).

In case of employing three beams, the interval between light beams, the number of disk rotations during one reproduction period and the number of reproduced tracks according to the number of jumped tracks are shown in table 1.

TABLE 1

| INTERVAL BETWEEN LIGHT BEAMS ($N_g$) | NUMBER OF DISK ROTATIONS DURING A REPRODUCTION PERIOD ($N_d$) | NUMBER OF JUMPED TRACKS ($N_j$) | NUMBER OF REPRODUCED TRACKS ($N_r$) |
|---|---|---|---|
| 1 | 1 | 1 | 2 |
| 2 | 2 | 3 | 5 |
| 3 | 3 | 5 | 8 |
| 4 | 4 | 7 | 11 |
| 5 | 5 | 9 | 14 |

It should be noted that the number of jumped tracks $N_j$ is $(N_b-1)N_g-1$ and the number of the reproduced tracks during one reproduction period $N_r$ is $N_b N_g-1$.

Figure 12:
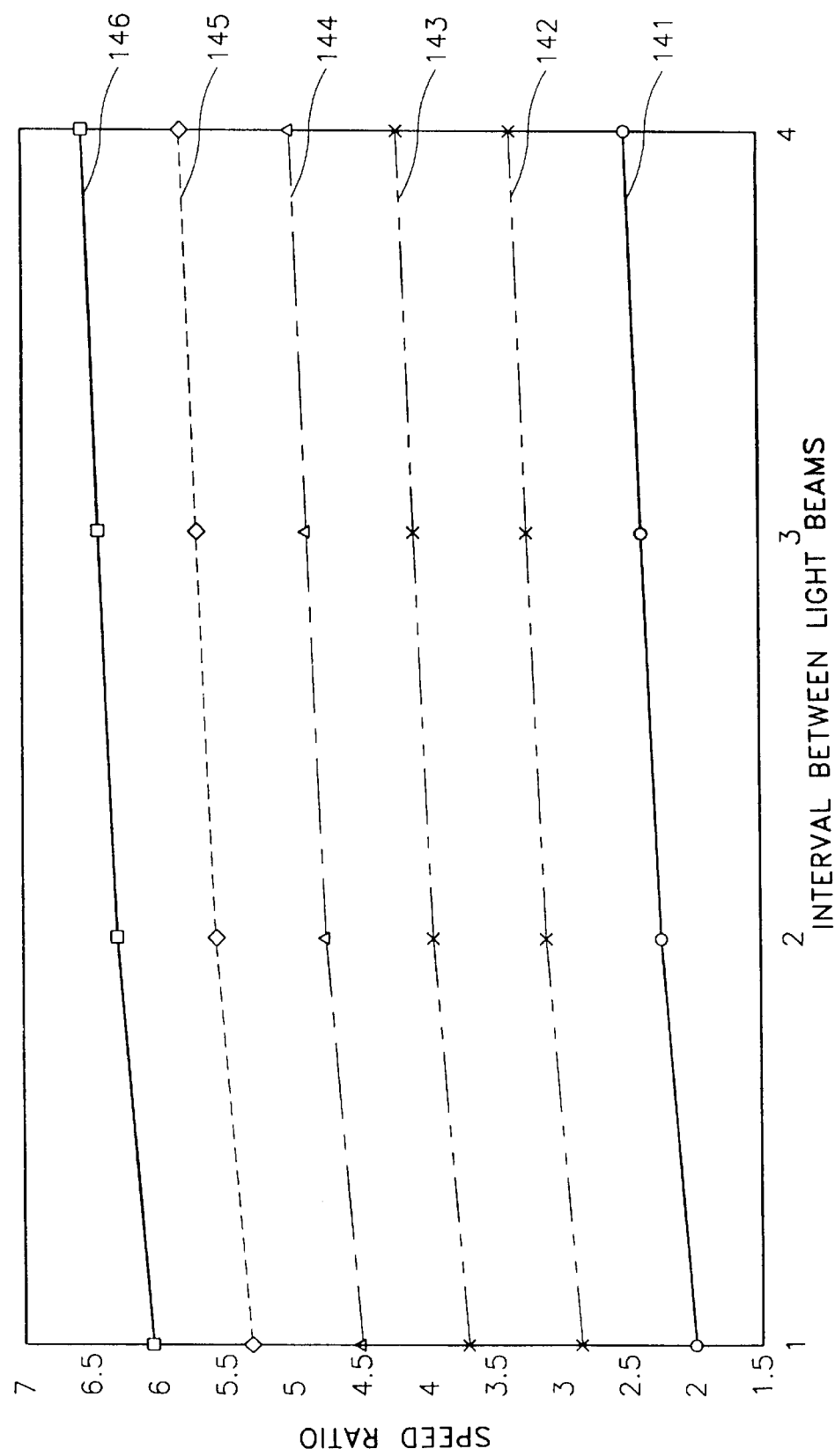
FIG. 12 is a graph for showing the speed ratio according to intervals between light spots in the present multiple tracks scanning method.

FIG. 12 is a graph in which the speed ratio according to the interval between light beams are indicated. Reference numerals 141 through 146 indicate the cases in which 3-beam, 4-beam, 6-beam, 7-beam and 8-beam are employed, respectively. Here, the speed ratio of a spindle motor does not change.

As shown in the drawing, in the case of employing 3 beams, the speed ratio improves by about twofold according to the interval between the light beams, and the speed ratio improves to rotate approximately 6 times or more faster when the 8 beams are employed.

As described above, the multiple tracks scanning method of an optical pickup according to the present invention is useful for determining the number of beams, the interval between the beams and the number of jump tracks for achieving the optimal effects in performance and speed ratio of an optical pickup device utilizing multiple beams.

It is noted that the present invention is not limited to the preferred embodiment described above, and it is apparent that variations and modifications by those skilled in the art can be effected within the spirit and scope of the present invention defined in the appended claims.

What is claimed is:

1. A method of scanning multiple tracks using an optical pickup, said method comprising the steps of:

simultaneously emitting a plurality of light beams on a plurality of tracks on a disk, and satisfying the following equations:

$N_j = (N_b-1)N_g - 1$ and $N_r = N_b N_g - 1,$ wherein $N_j$ represents the number of jumped tracks, $N_b$ represents the number of said plurality of light beams, $N_g$ represents an interval between the light beams, and $N_r$ represents the number of reproduced tracks during a reproduction period.

2. A method of scanning multiple tracks using an optical pickup as claimed in claim 1, wherein said method further satisfies the following equation:

$T_1 = T_j(N_b N_g - N_g - 1)/N_r + N_d T_c/N_r$ wherein $T_1$ represents a time required for reproducing one track, $T_j$ represents a time required for a track jump of said optical pickup, $T_c$ represents a time required for one rotation of said disk, and $N_d$ represents the number of disk rotations during said reproduction period.

* * * * *